Patented Jan. 23, 1951

2,538,884

UNITED STATES PATENT OFFICE 2,538,884

ACETONE-FORMALDEHYDE RESINS

Conrad F. Schrimpe, Woodbridge, N. J., assignor, by mesne assignments, to Union Carbide and Carbon Corporation, a corporation of New York No Drawing. Application July 18, 1947,
Serial No. 761,990

8 Claims. (Cl. 260—64)

This invention relates to acetone-formaldehyde resins and their preparation. They are obtained by a condensation reaction under basic conditions but the reaction reaches an equilibrium with both free acetone and formaldehyde present. The unreacted acetone can be eliminated, or increased amounts of formaldehyde can be added initially to react with practically all of the acetone. But the unreacted formaldehyde remains in solid solution in the condensation product as such as or loosely held methylol groups to make the resin unsaleable without their removal, and their removal entails expense as well as wastage of resin-forming material.

It has been found that organic compounds, such as acetoacetic esters, malonic esters, terpenes, indene, etc., react with the free formaldehyde and the methylol groups; common to these compounds is the presence of active hydrogens. The reactions, however, yield products that are not desirable in the resins; and, since they are difficult to remove, they remain in the acetone condensate product to depreciate the latter.

But monohydric phenols also have active hydrogens (in the positions on the ring ortho and para to the phenolic hydroxyl), and upon trial it has been discovered that they not only combine with the objectionable formaldehyde and methylol groups present in the acetone condensation product but enter into reaction with the product to yield improved homogeneous resins. These resins with hardening catalyst added, moreover, set to the infusible state at relatively high speeds (making them highly desirable as laminating binders) into hard attractively clear products characterized by marked resistance to caustic. By means of such additions, therefore, unreacted acetone can be largely avoided through increase in the formaldehyde ratio (preferably two or more moles to one mole of acetone), and the objectionable free formaldehyde and methylol groups are then made part of the reaction product instead of removing them with the consequent wastage.

It has been further found that condensation products of monohydric phenols (phenol, alkyl- or aryl-substituted phenol, bisphenol, etc.) and aldehydes are likewise effective for the purpose, provided that they are of the "fusible" or Novolak type. Novolaks can be obtained, as the literature discloses, by limiting the proportion of aldehyde to equimolecular or less and directing the condensation by an acid catalyst that is subsequently neutralized. The preferred Novolaks for the purposes of this invention are those prepared by reacting phenol with an aldehyde higher than formaldehyde and particularly acetaldehyde and butyraldehyde as described in patents to Baekeland, 1,598,546, August 31, 1926, and to Schrimpe, 1,667,872, May 1, 1927, and 1,742,519, January 7, 1930; these Novolak resins provide a smooth reaction with the acetone condensation product, and the combination product has fast heat-reactivity upon the addition of a hardening catalyst.

Furthermore, it is characteristic of acetone that it has active hydrogens on the methyl groups. Heretofore it has not been feasible to cast an acetone-formaldehyde resin in a clear condition, because in the hardening of the liquid intermediate the dissolved formaldehyde and loosely-held methylols release to create a porous structure. The theory of active hydrogens, as deduced from the operativeness of compounds so characterized, therefore points to acetone, and it has been found that acetone added to a liquid acetone-formaldehyde condensation product is effective for overcoming the porosity of structures cast therefrom.

Theoretically, the initial condensation of acetone and formaldehyde occurring under basic conditions is a methylol derivative of acetone, and as many as six methylol groups can be substituted on the acetone residue by employing sufficient formaldehyde. Upon reaction of a trimethylol derivative for instance with phenol, a resin chain forms from the reaction of a methylol OH and a ring hydrogen with separation of water:

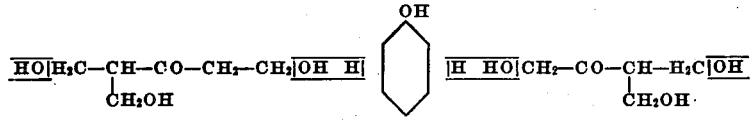

having the repeating unit

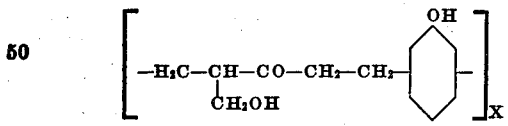

In the unit selected for illustration there thus remains a methylol group capable of reacting with an active hydrogen of a neighboring chain with the elimination of water and introduction of a methylene cross-linking bridge; such a chain product is therefore heat-hardenable to yield an infusible structure. A dimethylol derivative chain has reactive hydrogens capable of cross-linking by an agent that supplies the methylenes; and a monomethylol acetone derivative reacted with phenol contains active hydrogens capable of cross-linking under like conditions.

Because acid catalysts in the reaction of a phenol and formaldehyde to a Novolak promote the condensation of the first-formed simple monomethylol phenol to methylene derivatives instead of to polymethylol derivatives that occur under basic conditions (Walker on "Formaldehydes," pages 166, 186), phenol can be replaced by a Novolak to yield a similar chain structure upon condensation with the acetone derivative, the methylene-linked polyphenol structure replacing the phenol ring in the chain.

In general, therefore, it follows that organic compounds characterized by "active hydrogen" can be used for the purpose, but of primary concern are those that possess: (1) alpha-hydrogen atoms, i. e., hydrogen atoms attached to a carbon adjacent a carbonyl or carboxyl group, as in the case of ketones, particularly acetone (Walker, page 155), and of acids such as malonic, acetoacetic, etc. and their esters (Walker, pages 192, 195); and (2) hydrogen atoms in one or more of the 2, 4 and 6 active nuclear positions of monohydric phenolic compounds consisting of the phenols and the linear methylene-linked derivatives thereof (Walker, pages 165, 175–182). It is group (2) that is preferred because of the reactivity to infusible resins with acetone-formaldehyde condensation products.

The invention is illustrated by the following examples but is not restricted thereto.

Example 1

A reaction was permitted to proceed between two moles of 37 per cent aqueous formaldehyde and one mole of acetone in the presence of catalytic amounts of caustic soda. To 2000 grams of the undehydrated product (about 43.5% water) were added 700 grams of phenol and 75 cc. of ammonia (28%). Upon refluxing for 1.25 hours, dehydrating atmospherically for 1.25 hours and then vacuum-dehydrating to 120° C., there was obtained 1300 grams of a soft clear resin that baked to a hard clear infusible resin. In other words, about 71 per cent of the reactants was converted into useful resin; without the phenol addition only about 65 per cent is converted.

Example 2

There was mixed 1450 grams acetone (2.5 moles),
5250 grams 37% aqueous formaldehyde (6.5 moles) and
200 cc. diethylamine A reaction set in on standing, the initial pH being 9.4. Several hours after the reaction started the pH rose to 10.3, and it was necessary to cool to avoid losses; at the completion of the condensation the pH was 9.6. To the mass was added 1400 grams of phenol which diluted the pH to 8.1, and 65 cc. of ammonia was included as a supplementary catalyst. The mass was refluxed for an hour with a separating column and then atmospherically distilled for another hour; the final distillation was under a high vacuum to a temperature of 85° C., leaving 3860 grams of an anhydrous resin. The clear resin was soft and viscous but baked to a hard resin at about 135° C. and at a speed to make it useful for laminating.

Example 3

There was mixed 1450 grams acetone (2.5 moles),
2000 grams 37% aqueous formaldehyde (2.5 moles) and
2.5 grams NaOH.

The mixture reacted on standing and was controlled by cooling with water; after 24 hours the mass was dehydrated to 115° C. and yielded 1350 grams of a condensation product. A fusible phenol resin was also prepared from 60 parts of meta- and 40 parts of para-cresol mix reacted with less than molar proportions of 37% aqueous formaldehyde under acid conditions. To the acetone condensation product was added 1800 grams of the fusible cresol resin and heat applied; at first the cresol resin did not dissolve, but as the mass became anhydrous the resin went into solution. The reaction was then held at 140° C. until a brittle sample was obtained. The product when mixed with 6 per cent by weight of hexamethylenetetramine was heat-reactive.

A similar product was also prepared but substituting a phenol-formaldehyde Novolak resin for the cresol resin with the same results.

Example 4

A mixture of 580 grams acetone (1 mole)
1600 grams 37% aqueous formaldehyde (2 moles) and
4 grams caustic soda spontaneously reacted and was allowed to stand for 18 hours; the pH was 7 and the product was a water-white viscous liquid. To 1900 grams of the product was added 500 grams of a phenol-acetaldehyde resin prepared from about equimolecular parts of phenol and acetaldehyde under acid conditions and then made basic by the addition of 0.5 per cent of NaOH. The combined mass was refluxed and dehydrated to 140° C. to yield a soft resin that was heat-reactive; upon baking it gave an extremely hard infusible and clear resin.

Example 5

That acetone also functions similarly to the phenols, because of the presence of active hydrogens, was substantiated by first preparing a heat-hardening 1:1 mole acetone-formaldehyde liquid condensation product with hardening catalyst added; a portion was cast and baked, but a porous mass resulted. In the same liquid condensation product there was dissolved 10 per cent of acetone and 0.5 per cent of diethylenetriamine as hardening catalyst; the solution upon standing over night solidified, though still dentable by the finger nail, and upon baking at 60° C. to a hard condition, a non-porous tough casting was obtained. This result thus justified the theory and also demonstrated the availability of acetone to accomplish the desired end.

What is claimed is:

1. Condensation product of acetone and formaldehyde containing unreacted formaldehyde and methylol groups modified by reaction under basic conditions with an organic compound selected from the group consisting of aliphatic ketones having active alpha-hydrogen atoms, monohydric phenols having hydrogen atoms in at least one of the active nuclear positions and linear methylene-linked derivatives of the said phenols in amount sufficient to combine with unreacted formaldehyde and methylol groups present in the acetone-formaldehyde condensation product.

2. Condensation product of acetone and formaldehyde containing unreacted formaldehyde and methylol groups modified by reaction under basic conditions with a monohydric phenol having a hydrogen atom in at least one of the active nuclear positions and in an amount sufficient to combine with the unreacted formaldehyde and methylol groups present in the acetone-formaldehyde condensation product.

3. Condensation product of acetone and formaldehyde containing unreacted formaldehyde and methylol groups modified by reaction under basic conditions with a Novolak phenol-aldehyde resin in an amount to combine with the unreacted formaldehyde and methylol groups present in the acetone-formaldehyde condensation product.

4. Condensation product of acetone and formaldehyde containing unreacted formaldehyde and methylol groups modified by reaction under basic conditions with a ketone having an active alpha-hydrogen atom and in an amount sufficient to combine with the unreacted formaldehyde and methylol groups present in the acetone-formaldehyde condensation product.

5. Process which comprises reacting acetone with formaldehyde under basic conditions, and reacting under basic conditions the product with an organic compound selected from the group consisting of aliphatic ketones having active alpha-hydrogen atoms, monohydric phenols having hydrogen atoms in at least one of the active nuclear positions and linear methylene-linked derivatives of the said phenols.

6. Process which comprises reacting acetone with formaldehyde under basic conditions, and reacting under basic conditions the product with a ketone having an active alpha-hydrogen atom.

7. Process which comprises reacting acetone with formaldehyde under basic conditions to yield a product containing methylol groups and unreacted formaldehyde, and reacting under basic conditions the product with a monohydric phenol having a hydrogen atom in at least one of the active nuclear positions.

8. Process of adding to an acetone-formaldehyde reaction product containing unreacted formaldehyde and methylol groups an organic compound selected from the group consisting of aliphatic ketones having active alpha-hydrogen atoms, monohydric phenols having hydrogen atoms in at least one of the active nuclear positions and linear methylene-linked derivatives of the said phenols, and causing a reaction under basic conditions of the compound with the formaldehyde and methylol groups.

CONRAD F. SCHRIMPE.

REFERENCES CITED

The following references are of record in the file of this patent:

UNITED STATES PATENTS

| Number | Name | Date |
|---|---|---|
| 2,191,802 | Novotny et al. | Feb. 27, 1940 |
| 2,206,906 | Loos | July 9, 1940 |